Patented Sept. 20, 1938

2,130,565

UNITED STATES PATENT OFFICE 2,130,565

PROCESS OF TREATING TITANIUM-BEARING MATERIALS

Charles L. Schmidt, St. Louis, Mo., assignor, by mesne assignments, to National Lead Company, New York, N. Y., a corporation of New Jersey No Drawing. Application December 4, 1935, Serial No. 52,807

11 Claims. (Cl. 23—117)

The present invention relates to a treatment of titanium-bearing materials, such as natural titanium ores, alkali-treated natural titanium ores, or artificially-prepared titanium-oxygen compounds, whereby such materials are converted into water-soluble forms.

An object of my invention is an improved method for the preparation of titanium compositions, for example, the digestion cake resulting from a sulfuric acid treatment of a titanium-bearing material, which are readily soluble in aqueous solvents and as such are excellent primary materials for the preparation of titanium pigments, organic or inorganic titanium salts, and the like.

In the usual processes for treating titanium ores, such as ilmenite, the ore is digested with concentrated sulfuric acid and the titanium is converted to a more or less water-soluble sulfate. In this digestion, it is desirable that the reaction take place rapidly and that the products of the reaction set up into a crystalline cake, which can be readily dissolved in water. A number of variables affect the formation of this cake such as the ratio of ore and acid, concentration of acid, temperature, fluidity of the mass, etc. Frequently, the reaction product is a plastic mass which is not of a crystalline nature. Such a mass dissolves slowly in water and tends to produce unstable solutions of titanium. A mass of this nature can usually be solidified by heating for long periods of time but even after such treatment it does not possess the porosity and ready solubility of an ideal cake.

Titanium ores such as rutile are not readily attacked by mineral acids. Consequently, a number of processes based upon a fusion or fritting of rutile with caustic alkali have been suggested. One such method is suggested in U. S. Patent No. 1,929,521. This patent discloses a treatment of rutile with alkali to form a compound of the general formula, $M_2Ti_5O_{11}$, where M is an alkali metal. The products of such treatments of titanium ores also vary in the degree of water-solubility depending on the amount of alkali used in their preparation as well as upon other factors involved in the processes. A compound of the type $M_2Ti_5O_{11}$ requires an additional sulfuric acid treatment in order to render it soluble in water but such a treatment does not always yield porous crystalline, easily soluble products.

Furthermore, hydrated or dehydrated calcined titanium-oxygen compounds require similar treatments with concentrated mineral acid or caustic alkali before they are rendered soluble in aqueous solvents. The disadvantages met with in treating natural ores are also encountered when treating the artificially prepared titanium-oxygen compounds.

I have now discovered improved methods of preparing products from titanium-bearing materials, such as natural titanium ores, alkali-treated natural titanium ores, or artificially prepared titanium-oxygen compounds which possess the desired porosity, crystalline structure, and ready solubility of an ideal cake. Briefly, I have discovered that the reaction between sulfuric acid, on the one hand, and a titanium-bearing material, such as either natural titanium ores, alkali-treated titanium ores, or artificially prepared titanium-oxygen compounds, on the other hand, may be seeded or directed to produce the desired type of reaction mass by carrying out the thermal reaction in the presence of a small amount of a suitable added seeding material, such as an inorganic crystalline sulfate of titanium, for example, a basic titanium sulfate of the general formula $TiO.SO_4$, commonly known as titanyl sulfate. For the sake of convenience and because it is particularly well adapted for the practice of my invention, I prefer to use the so-called titanyl sulfate crystals.

Titanyl sulfate may be prepared by any known methods, as for example, those described on page 93 of J. W. Mellor's "Comprehensive Treatise on Inorganic and Theoretical Chemistry," Volume VII, year 1927. Once a sufficient quantity of titanyl sulfate is obtained to seed a reaction between hydrated or dehydrated titanium-oxygen compounds and sulfuric acid, according to the method of the present invention, the resulting product, being substantially pure titanyl sulfate crystals, may be employed in subsequent operations. I have also found that small amounts of a digestion mass, obtained from a seeded thermal reaction between sulfuric acid and a titanium-bearing material and possessing the desired porosity, crystalline structure and solubility, may be used to advantage as seeding material in place of pure titanyl sulfate crystals.

In practicing my invention, I have found that the quantity of seeding material which is effective is relatively small. For example, I have found that from 0.5%–10%, based on the $TiO_2$ content of the titanium-bearing materials, is usually sufficient to secure the desired results although larger amounts may be used without departing from the scope of the invention. The addition of the seeding material to the titanium-bearing material may be made prior to or during the digestion with sulfuric acid. The digestion is carried out in the usual manner.

In order to illustrate my invention, the following examples are given. It should be understood, however, that these examples do not limit the scope of the invention, as to temperature, proportions or reactants, etc., employed.

*Example 1.*—1000 lbs. of finely powdered rutile are mixed with 1250 lbs. of a 20% solution of sodium carbonate and evaporated to dryness. The dried material is crushed and roasted for several hours at 950° C. The resulting products correspond in analysis with the formula $Na_2Ti_5O_{11}$.

600 lbs. of the roasted material are mixed with 1140 lbs. of 66° Bé. sulfuric acid and 10 lbs. of titanyl sulfate crystals. The mixture is heated until reaction takes place, whereupon a crystalline cake or mass is produced which is porous and readily soluble in water.

*Example 2.*—200 lbs. of precipitated and dehydrated titanium dioxide, $TiO_2$, and 2 lbs. of titanyl sulfate crystals are heated with 563 lbs. of 87% sulfuric acid. After a reaction, lasting about 10 minutes, a crystalline cake starts to form which is complete in about 45 minutes.

The products resulting from my improved method of treating titanium-bearing materials are porous, crystalline, are readily soluble in water yielding stable solutions which are excellently adapted for use in manufacturing titanium pigments, organic or inorganic titanium compounds and the like.

In the foregoing description and in the claims appended hereto, I have used the term "titanium-bearing material" to include natural titanium ores, such as rutile and ilmenite, the reaction products of an alkali treatment of natural titanium ores as well as artificially prepared titanium-oxygen compounds, such as hydrated titanium-oxygen compounds and calcined, dehydrated titanium dioxide. By the term "seeding material" I mean to include the crystalline compounds derived from titanium and sulfuric acid, such as titanyl sulfate, as well as the reaction products obtained by the practice of my herein described invention, which are equivalent to titanyl sulfate in seeding effect on subsequent reactions between sulfuric acid and a titanium-bearing material.

The foregoing detailed description has been given for clearness of understanding and no undue limitations are to be deduced therefrom, but the appended claims should be construed as broadly as possible in view of prior art.

I claim:

1. A method of preparing a water-soluble titanium composition, which consists in adding a small amount of an inorganic crystalline sulfate of titanium to a reaction mixture comprising such proportions of sulfuric acid and a titanium-bearing material as will form on heating a solid reaction mass, and heating the mixture to cause a reaction to take place with the formation of a porous, crystalline reaction product which is readily soluble in water.

2. A method of preparing a water-soluble titanium composition which comprises mixing together sulfuric acid and a titanium-bearing material in such proportions that a solid reaction mass is formed on heating and adding thereto a small amount of an inorganic crystalline sulfate of titanium, and then heating the resultant mixture to cause a reaction to take place between the said sulfuric acid and the titanium-bearing material to produce a porous, crystalline mass readily soluble in water.

3. A method of preparing a water-soluble titanium composition which comprises mixing together sulfuric acid and a natural titanium ore in such proportions that a solid reaction mass is formed on heating and adding thereto a small amount of an inorganic crystalline sulfate of titanium, and then heating the resultant mixture to cause a reaction to take place between the said sulfuric acid and the natural titanium ore to produce a porous, crystalline mass readily soluble in water.

4. A method of preparing a water-soluble titanium composition which comprises mixing together sulfuric acid and alkali-treated rutile in such proportions that a solid reaction mass is formed on heating and adding thereto a small amount of an inorganic crystalline sulfate of titanium, and then heating the resultant mixture to cause a reaction to take place between the said sulfuric acid and the alkali-treated rutile to produce a porous, crystalline mass readily soluble in water.

5. A method of preparing a water-soluble titanium composition which comprises mixing together sulfuric acid and an artificially prepared titanium-oxygen compound in such proportions that a solid reaction mass is formed on heating and adding thereto a small amount of an inorganic crystalline sulfate of titanium, and then heating the resultant mixture to cause a reaction to take place between the said sulfuric acid and the said titanium-oxygen compounds to produce a porous, crystalline mass readily soluble in water.

6. A method of preparing a water-soluble titanium composition which comprises mixing together sulfuric acid and an alkali treated rutile compound having substantially a composition corresponding to the formula $M_2Ti_5O_{11}$ where M is an alkaline reacting metal in such proportions that a solid reaction mass is formed on heating and adding thereto an amount of crystalline titanyl sulfate, $TiO.SO_4$, between 0.5% and 10% based on the $TiO_2$ content of the alkali treated rutile compound, and then heating the resultant mixture to cause a reaction to take place between the said sulfuric acid and the alkali treated rutile compound to produce a porous, crystalline mass readily soluble in water.

7. A method of preparing a water-soluble titanium composition which comprises mixing together sulfuric acid and dehydrated titanium oxide in such proportions that a solid reaction mass is formed on heating and adding thereto an amount of crystalline titanyl sulfate, $TiO.SO_4$, between 0.5% and 10% based on the $TiO_2$ content of the dehydrated titanium oxide, and then heating the resultant mixture to cause a reaction to take place between the said sulfuric acid and the dehydrated titanium oxide to produce a porous, crystalline mass readily soluble in water.

8. A method of preparing a water-soluble titanium composition which comprises mixing together sulfuric acid and a titanium-bearing material in such proportions that a solid reaction mass is formed on heating and adding thereto a small amount of the crystalline reaction product resulting from a previous thermal reaction between sulfuric acid and titanium-oxygen compounds carried out in the presence of a small amount of a separately prepared inorganic crystalline sulfate of titanium, and then heating resultant mixture to cause a reaction to take place between the said sulfuric acid and the said titanium-bearing material to produce a porous, crystalline mass readily soluble in water.

9. In a method of preparing a water-soluble titanium composition by means of a thermal reaction between sulfuric acid and a titanium-bearing material, the step which consists in adding a small amount of a crystalline sulfate of titanium to a reaction mixture comprising such proportions of a titanium-bearing material and sulfuric acid as will form a solid reaction mass on heating.

10. In a method of preparing a water-soluble composition by means of a thermal reaction between sulfuric acid and a titanium-bearing material, the step which consists in heating a reaction mixture comprising such proportions of sulfuric acid and a titanium-bearing material as will form a solid reaction product on heating in the presence of a small amount of a separately prepared inorganic crystalline sulfate of titanium.

11. A method of preparing a water-soluble titanium composition, which consists in heating a mixture of such proportions of sulfuric acid and a titanium-bearing material as will form a solid reaction product on heating to initiate a thermal reaction between the said sulfuric acid and the said titanium-bearing material and then adding to the reaction mixture, during the said thermal reaction, a small amount of a separately prepared inorganic crystalline sulfate of titanium.

CHARLES L. SCHMIDT.